US006947629B2

(12) United States Patent
Chu et al.

(10) Patent No.: US 6,947,629 B2
(45) Date of Patent: Sep. 20, 2005

(54) 3D IMAGE FEEDBACK OPTICAL BEAM ALIGNMENT

(75) Inventors: Charles Chu, Irvine, CA (US); Jingyu Zhou, Irvine, CA (US); Michael Young, Irvine, CA (US)

(73) Assignee: Transoptix, Inc., Irvine, CA (US)

( * ) Notice: Subject to any disclaimer, the term of this patent is extended or adjusted under 35 U.S.C. 154(b) by 308 days.

(21) Appl. No.: 10/383,958

(22) Filed: Mar. 7, 2003

(65) Prior Publication Data

US 2004/0057658 A1 Mar. 25, 2004

Related U.S. Application Data

(60) Provisional application No. 60/413,283, filed on Sep. 24, 2002.

(51) Int. Cl.[7] .................................... G02B 6/35
(52) U.S. Cl. .......................... 385/18; 385/17; 385/24; 385/47; 385/50
(58) Field of Search .................... 385/15–19, 24, 385/31, 33, 39, 47, 50

(56) References Cited

U.S. PATENT DOCUMENTS

| | | |
|---|---|---|
| 4,696,062 A | 9/1987 | LaBudde |
| 4,945,489 A | 7/1990 | Vahab |
| 5,155,623 A | 10/1992 | Miller et al. |
| 5,206,497 A | 4/1993 | Lee |
| 6,091,867 A | 7/2000 | Young et al. |
| 6,097,858 A | 8/2000 | Laor |
| 6,101,299 A | 8/2000 | Laor |
| 6,222,954 B1 | 4/2001 | Riza |
| 6,243,507 B1 | 6/2001 | Goldstein et al. |
| 6,259,835 B1 | 7/2001 | Jing |
| 6,285,022 B1 | 9/2001 | Bhalla |
| 6,320,993 B1 | 11/2001 | Laor |
| 6,330,380 B1 | 12/2001 | Young et al. |
| 6,337,760 B1 | 1/2002 | Huibers et al. |
| 6,430,328 B1 | 8/2002 | Culver et al. |
| 6,711,314 B1 * | 3/2004 | Mori et al. ................... 385/17 |
| 6,801,684 B2 * | 10/2004 | Losch .......................... 385/18 |

* cited by examiner

*Primary Examiner*—Frank G. Font
*Assistant Examiner*—Michael P. Mooney

(57) ABSTRACT

A feedback control system for an optical switch includes a reference mirror that reflects a signal wavelength of light and transmits a reference wavelength. A detector array indicates positions, on the reference mirror, of first and second reference light beams transmitted through the reference mirror onto the detector array. An array of adjustable mirrors is controlled by a controller for adjusting each mirror in the array. The controller receives the position of the first reference light beam and adjusts a first mirror so that the first position is moved to a pre-determined location on the detector array, and receives the position of the second reference light beam and adjusts a second mirror so that the second position is moved to the same pre-determined location on the detector array, forming an aligned optical path on which a signal light beam can be transmitted through the optical switch.

25 Claims, 8 Drawing Sheets

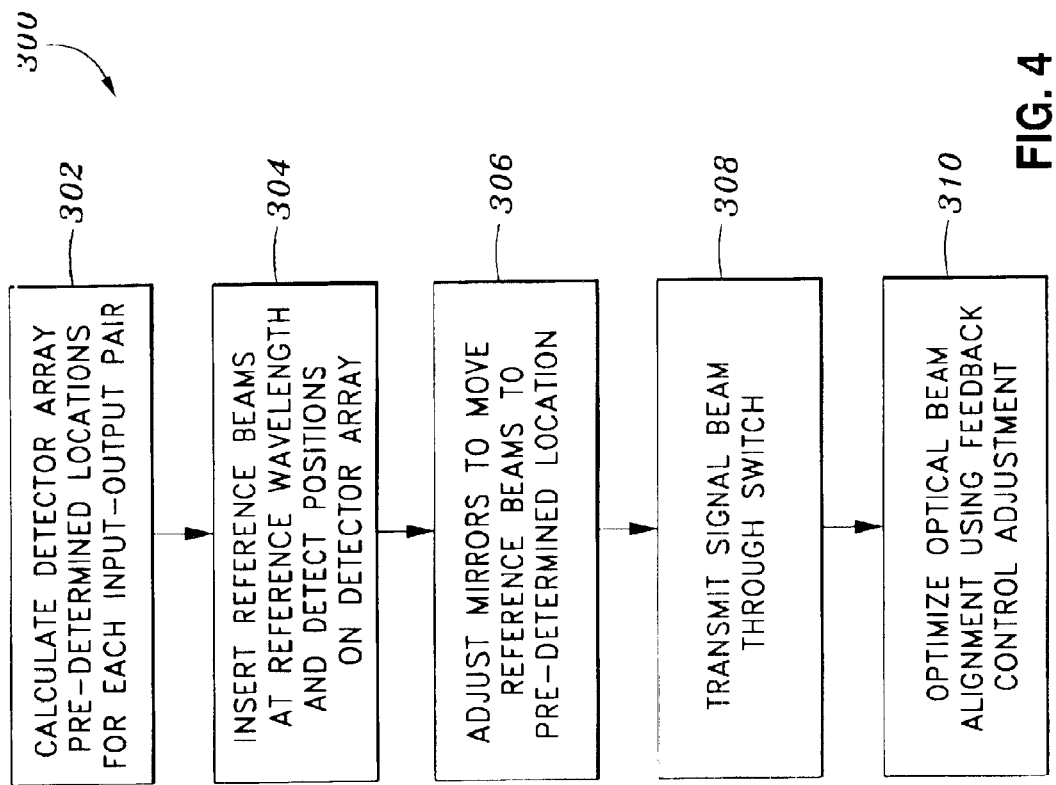

3D IMAGE FEEDBACK OPTICAL BEAM ALIGNMENT

CROSS REFERENCE TO RELATED APPLICATIONS

This application claims the benefit of U.S. Provisional Application No. 60/413,283, filed Sep. 24, 2002.

BACKGROUND OF THE INVENTION

The present invention generally relates to fiber optic communications and, more particularly, to feedback control of optical beam alignment in a 3-dimensional, all-optical, fiber optical switch.

Fiber optical switches find wide application in communications. Fiber optical switches are increasingly used in the telecommunications industry, where fiber optical switches may be used, for example, in a central office core router of a telecommunications network as cross-connect switches for metro and long haul services.

FIG. 1A shows an optical communication system hierarchy 100 according to the prior art, including long haul and metro telecommunications switching networks, for example, long haul switching network 102 and metro telecommunications switching networks 104 and 106. Optical communication system hierarchy 100 may include nodes—such as nodes 108—that communicate using optical fiber links—such as links 110—between the nodes, typically connected in loops. Optical fibers may be used in the links—such as links 110—as working, protection, add, or drop links, as known in the art, for transmitting signal light beams between nodes—such as nodes 108. A node may be, for example, a telephone exchange, such as public switched telephone network (PSTN) 112 or cellular network 114, shown in FIG. 1A connected, for example, by a synchronous optical network (SONET) network 116. As seen in FIG. 1A, for example, metro telecommunications switching network 104 may be connected via one or more optical links—such as optical links 117—to residential extended digital subscriber line (x-DSL) network 118. Also as seen in FIG. 1A, for example, metro telecommunications switching network 106 may be connected via one or more optical links—such as optical links 119—to internet protocol (IP) router 120, connecting asynchronous transfer mode (ATM) switch 122 and Ethernet local area network (LAN) 124 for a regional internet service provider (ISP). Also as seen in FIG. 1A, for example, metro telecommunications switching network 106 may be connected via one or more optical links—such as optical links 125—to a corporate enterprise systems connection (ESCON) network 126, which may comprise a frame relay ESCON fiber channel network or gigabit Ethernet, as known in the art. Each of PSTN 112, cellular network 114, SONET network 116, residential x-DSL network 118, IP router 120, ATM switch 122, Ethernet LAN 124, and ESCON network 126 may connected through an optical cross connect switch to a switching network such as metro telecommunications switching networks 104 and 106.

Referring now to FIG. 1B, an example of a long haul switching network 130 is illustrated. Long haul switching network 130 may correspond, for example, to long haul switching network 102, shown in optical communication system hierarchy 100 of FIG. 1A. Long haul switching network 130 may include nodes—such as nodes 108—that communicate using optical fiber links—such as links 110—between the nodes. Links—such as links 110—typically connect the nodes—such as nodes 108—in loops. For example, nodes 132, 134, and 136 are shown in FIG. 1B connected in a loop by links 131, 133, and 135. Link 131 connects node 136 with node 132; link 133 connects node 132 with node 134, and link 135 (shown as a broken link) would ordinarily connect node 134 with node 136. Links—such as links 131, 133, and 135—may comprise multiple optical fibers that may be used as working, protection, add, or drop fibers, in any combination, as known in the art, for transmitting signal light beams between nodes—such as nodes 132, 134, and 136. For example, communication between node 136 and node 134 would ordinarily be transmitted over working fibers of link 135. If link 135 should become disabled, illustrated in FIG. 1B by a break in link 135, communication can be rerouted for example, over links 131 and 133 between node 136 and node 134 via node 132, using protection fibers included in links 131 and 133. Such rerouting can be accomplished, as known in the art, by means of optical cross connect switches or protection switches, which may be optical cross connect switches configured to perform such rerouting.

Referring now to FIG. 1C, examples of several types of connections to a metro telecommunications switching network 140 is illustrated. Metro telecommunications switching network 140 may correspond, for example, to metro telecommunications switching network 104 or metro telecommunications switching network 106, shown in optical communication system hierarchy 100 of FIG. 1A. Metro telecommunications switching network 140 may include nodes—such as nodes 142, 144, 146, and 148—connected in a loop by links 141, 143, 145, and 147, where link 141 connects node 148 with node 142; link 143 connects node 142 with node 144, and so forth, as shown in FIG. 1C. Links—such as links 141, 143, 145, and 147—may comprise multiple optical fibers that may be used as working, protection, add, or drop fibers, in any combination, as known in the art, for transmitting signal light beams between nodes—such as nodes 142, 144, 146, and 148. Each of nodes 142, 144, 146, and 148—as well as nodes 108, shown in FIGS. 1A, 1B, and 1C, may comprise one or more optical cross connect switches. Each cross-connect switch may be configured to act as a non-blocking cross-connect switch, protection switch, add/drop module, or mux/demux, as known in the art.

Individual clients are typically connected into a metro telecommunications switching network—such as metro telecommunications switching network 140—using an add/drop module. For example, add/drop module 150 may be used, as known in the art and shown in FIG. 1C, to connect LAN 152, ATM switch 154, and access router 156 to node 142 of metro telecommunications switching network 140. Also, for example, mux/demux 158 may be used, as known in the art and shown in FIG. 1C, to connect SONET add/drop multiplexer (ADM) 160, ESCON node 162, and enterprise frame relay router 164 to node 109 of metro telecommunications switching network 140. Also, for example, SONET distributed communication system (DCS) 166 may be connected, as known in the art and shown in FIG. 1C, to node 144 of metro telecommunications switching network 140. Each node—such as node 144—of metro telecommunications switching network 140 may appropriately route the signals connected to the node using optical cross-connect switches included in the node and configured—for example, as non-blocking cross-connect switch, protection switch, add/drop module, or mux/demux—to perform the appropriate function. Thus, the cross-connect switch has come to be a fundamental component of telecommunication systems.

An optical cross-connect switch may allow light to be routed between optical fibers in such a way that any optical fiber from one side of the switch can be optically connected to any of the optical fibers on another side of the switch. Metro and long haul services may be provided using dense wavelength division multiplexing (WDM or DWDM). DWDM is a technology that uses multiple lasers and transmits several wavelengths of light simultaneously over a single optical fiber. Each signal travels within its unique color band, which is modulated by the data (text, voice, video, for example). DWDM enables the existing fiber infrastructure of the telephone companies and other carriers to be dramatically increased. DWDM systems exist that can support more than 150 wavelengths. Such systems can provide more than 1,000 Gbps of data transmission on one optical fiber. Several key components in optical communications networks—including optical add/drop modules (OADM), protection switches, and cross-connect switches—may be implemented using optical switches Conventional fiber optical switches that connect optical fiber lines are electro-optical. Such conventional switches convert photons from the input side to electrons internally in order to do the signal switching electronically and then convert back to photons on the output side, thus being referred to as optical-electrical-optical (OEO) switches. By way of contrast, an all-optical fiber optical switch, referred to as optical-optical-optical (OOO), is a switching device that maintains the signal as light from input to output. Although some vendors call electro-optical switches "optical switches," true optical switches, i.e., all-optical switches, support all transmission speeds. Unlike electronic switches, which are tied to specific data rates and protocols, all-optical, or OOO, switches direct the incoming data bit stream to the output port no matter what the line speed or protocol (such as IP, ATM, or SONET) and do not have to be upgraded for any changes to the protocol.

An optical switch is a device that can be used to switch a beam of light by either leaving the light path to pass through a location unaffected or changing the light path to a different direction at the location. The switching can be done mechanically, for example, by moving a mirror between two distinct and stable positions—in the path of the light, and out of the path of the light. Switching by changing a light path between two distinct and stable positions may be referred to as digital switching. Digital switching is usually implemented by a switch in which the ends of all of the optical fibers connected to the switch are in the same plane, referred to as being 2-dimensional.

For example, a 2-dimensional optical cross-connect switch can be implemented with a planar array of mirrors that can be moved into and out of the path of the light for switching light beams between optical fibers. Switching can also be done mechanically, for example, by moving a mirror continuously from one position to another in order to redirect a light path from one destination to another, which may be referred to as analog switching. Because the mirror is continuously adjustable in analog switching, the geometrical configuration in which optical fibers are connected to the switch is less constrained. For example, the ends of all of the optical fibers connected to the analog switch need not be in the same plane, so that the analog switch may be referred to as being 3-dimensional.

FIG. 2A illustrates an example of a 3-dimensional optical switch 170, as known in the art. Optical switch 170 may comprise an input fiber array 172 of input optical fibers 174. The light beam 175 from each input optical fiber 174 may be focused by a collimating lens 176, included in lens array 178, at an adjustable mirror 179, included in micro-electro-mechanical systems (MEMS) adjustable mirror array 180, where each input optical fiber 174 has a particular collimating lens 176 from lens array 178 and a particular adjustable mirror 179 from MEMS adjustable mirror array 180 dedicated to the input optical fiber 174.

Similarly, optical switch 170 may comprise an output fiber array 182 of output optical fibers 184. The light beam 185 to each output optical fiber 184 may be focused by a collimating lens 186, included in lens array 188, at an adjustable mirror 189, included in MEMS adjustable mirror array 190, where each output optical fiber 184 has a particular collimating lens 186 from lens array 188 and a particular adjustable mirror 189 from MEMS adjustable mirror array 190 dedicated to the output optical fiber 184. (It should be noted that because light can propagate in either direction along an optical fiber, the terms "input" and "output" are used for convenience and do not necessarily limit the direction of signal propagation.) Thus, there is a dedicated adjustable mirror for each input and each output optical fiber of optical switch 170.

FIG. 2B shows an example of a single adjustable mirror—such as adjustable mirror 179—from MEMS adjustable mirror array 180, of a typical silicon-on-insulator (SOI) construction, as known in the art. Adjustable mirror 179 is shown mounted in gimbals 191, which may also act as a spring for returning adjustable mirror 179 to a neutral position, as known in the art.

FIG. 2C shows adjustable mirror 179 in cross section before selective etching of silicon dioxide (SiO2) material 193 is used to form the components of the gimbals 191 and electrodes 192, and FIG. 2D shows adjustable mirror 179 in cross section after etching is used to form the components of the gimbals 191 and electrodes 192. For the particular example illustrated in FIGS. 2B–2D, the position, i.e., angle, of adjustable mirror 179 may be controlled by an electric field applied at electrodes 192, as known in the art. Alternative configurations may control the position of the adjustable mirror using magnetic fields, as known in the art. A MEMS adjustable mirror array has been manufactured by Lucent Technologies, Inc. under the trade name "Microstar® Mems Mirrors". An alternative to an array of adjustable mirrors—such as MEMS adjustable mirror arrays 180 and 190—may be a spatial light modulator (SLM), such as that disclosed by U.S. Pat. No. 6,430,328 issued to Culver, et al., which could be used to steer light beams 175 and 185 in place of MEMS adjustable mirror arrays 180 and 190.

Mirror positioning for the 3-dimensional analog optical switch requires a high degree of accuracy in order to direct a light beam from any one of an input array of optical fibers to any chosen one of an output array of optical fibers, also referred to as "targeting". U.S. Pat. No. 6,101,299 issued to Laor discloses a fiber optical control system for use in an optical switch in which a feedback control system collects a feedback signal from an output fiber end by incorporating a sensor for detecting the feedback signal in front of the collimating lens for the fiber for targeting the beam. The limited targeting accuracy of the configuration limits applicability of the feedback control system to direct fiber-fiber or fiber-mirror-fiber configurations. Thus, the system disclosed by Laor is impractical for typical 3-dimensional analog switches requiring more than two mirrors in the optical path.

U.S. Pat. No. 5,206,497 issued to Lee discloses a fiber optical control system for use in an optical switch in which a partially silvered mirror is used to separate components of a light beam so that a monitor component reflected off the mirror can be used for aligning the beam, while a reduced intensity signal-carrying, or payload, component is transmitted through the mirror to the output array of optical fibers. The transmitted (payload) and monitor components have the same wavelength.

As can be seen, there is a need for an analog optical switch and control system that achieves accurate beam alignment for multiple mirror switch configurations. Also, there is a need for an optical switch that can obtain accurate beam alignment without sacrificing signal intensity.

SUMMARY OF THE INVENTION

In one aspect of the present invention, an optical switch comprises a reference mirror that reflects a signal wavelength of light and transmits a reference wavelength of light; a first adjustable mirror array; a second adjustable mirror array; a detector array; and a controller. The first adjustable mirror array is disposed relative to the reference mirror so that a first reference light beam having the reference wavelength is reflected from the first adjustable mirror array to the reference mirror. The second adjustable mirror array is disposed relative to the reference mirror so that a second reference light beam having the reference wavelength is reflected from the second adjustable mirror array to the reference mirror. The detector array is adjacent to the reference mirror. The detector array indicates a first position of the first reference light beam incident on the reference mirror and transmitted through the reference mirror to the detector array, and indicates a second position of the second reference light beam incident on the reference mirror and transmitted through the reference mirror to the detector array. The controller receives the first position and adjusts the first adjustable mirror array so that the first position is moved to a pre-determined location on the reference mirror, and the controller receives the second position and adjusts the second adjustable mirror array so that the second position is moved to the pre-determined location, thereby establishing an optical beam alignment for a signal light beam having the signal wavelength, where the signal light beam is reflected from the first adjustable mirror array to the reference mirror and is reflected from the reference mirror to the second adjustable mirror array.

In another aspect of the present invention, an optical switch comprises a reference mirror that reflects a signal wavelength of light and transmits a reference wavelength of light; a first adjustable mirror array; a second adjustable mirror array; at least one input optical fiber; at least one output optical fiber; a detector array; and a controller. The first adjustable mirror array is disposed relative to the reference mirror so that a first reference light beam having the reference wavelength is reflected from the first adjustable mirror array to the reference mirror. The second adjustable mirror array is disposed relative to the reference mirror so that a second reference light beam having the reference wavelength is reflected from the second adjustable mirror array to the reference mirror. The input optical fiber and the output optical fiber have an optical path between them, with the optical path reflecting off the first adjustable mirror array, the reference mirror, and the second adjustable mirror array so that a pre-determined location is the unique location on the reference mirror where an angle of incidence is equal to an angle of reflection for the optical path. The detector array is adjacent to the reference mirror. The detector array indicates a first position of the first reference light beam incident on the reference mirror and transmitted through the reference mirror to the detector array, and indicates a second position of the second reference light beam incident on the reference mirror and transmitted through the reference mirror to the detector array. The controller receives the first position and adjusts the first adjustable mirror array so that the first position is moved to the pre-determined location and receives the second position and adjusts the second adjustable mirror array so that the second position is moved to the pre-determined location, thereby establishing an optical beam alignment for a signal light beam having the signal wavelength. The signal light beam propagates on the optical path between the input optical fiber and the output optical fiber.

In still another aspect of the present invention, a 3-dimensional optical cross-connect switch comprises a reference mirror that reflects a signal wavelength of light and transmits a reference wavelength of light; a first adjustable mirror array; a second adjustable mirror array; an input fiber array; an output fiber array; a detector array; and a controller. The first adjustable mirror array is disposed relative to the reference mirror so that a first reference light beam having the reference wavelength is reflected from the first adjustable mirror array to the reference mirror. The second adjustable mirror array is disposed relative to the reference mirror so that a second reference light beam having the reference wavelength is reflected from the second adjustable mirror array to the reference mirror. The input fiber array comprises at least one input optical fiber, with the input optical fiber transmitting the first reference light beam at the reference wavelength. The output fiber array comprises at least one output optical fiber, with the output optical fiber transmitting the second reference light beam at the reference wavelength. The input optical fiber and the output optical fiber have an optical path between them, with the optical path reflecting off the first adjustable mirror array, the reference mirror, and the second adjustable mirror array. A pre-determined location is the unique location on the reference mirror where an angle of incidence is equal to an angle of reflection for the optical path. The detector array is adjacent to the reference mirror, with the detector array comprising charge-coupled devices, which sense a first position of the first reference light beam incident on the reference mirror and transmitted through the reference mirror to the detector array. The charge-coupled devices also sense a second position of the second reference light beam incident on the reference mirror and transmitted through the reference mirror to the detector array. The detector array indicates the first position and the second position relative to the input optical fiber and the output optical fiber. The controller comprises a memory, with the pre-determined location being stored in the memory. The controller receives the first position and adjusts the first adjustable mirror array so that the first position is moved to the pre-determined location and the controller receives the second position and adjusts the second adjustable mirror array so that the second position is moved to the pre-determined location, thereby establishing an optical beam alignment for a signal light beam having the signal wavelength. The signal light beam is transmitted from the input optical fiber at the signal wavelength on the optical path to the output optical fiber.

In yet another aspect of the present invention, an optical switching network comprises a number of nodes and a number of links. At least one of the nodes comprises an optical switch, each of the links comprises at least one optical fiber, each of the links optically connects two of the nodes, at least one of the links includes an input optical fiber connected to the optical switch, and at least one of the links includes an output optical fiber connected to the optical switch. The optical switch comprises a reference mirror that reflects a signal wavelength of light and transmits a reference wavelength of light; a first adjustable mirror array; a second adjustable mirror array; an input fiber array; an output fiber array; a detector array; and a controller. The first adjustable mirror array is disposed relative to the reference mirror so that a first reference light beam having the reference wavelength transmitted through the input optical fiber is reflected from the first adjustable mirror array to the reference mirror. The second adjustable mirror array is disposed relative to the reference mirror so that a second reference light beam having the reference wavelength transmitted through the output optical fiber is reflected from the second adjustable mirror array to the reference mirror. The detector array is adjacent to the reference mirror. The detector array indicates a first position of the first reference light beam incident on the reference mirror and transmitted through the mirror to the detector array, and indicates a second position of the second reference light beam incident on the reference mirror and transmitted through the reference mirror to the detector array. The controller comprises a memory, with a pre-determined location being stored in the memory. The controller receives the first position and adjusts the first adjustable mirror array so that the first position is moved to the pre-determined location on the reference mirror and the controller receives the second position and adjusts the second adjustable mirror array so that the second position is moved to the pre-determined location, thereby establishing an optical beam alignment for a signal light beam having the signal wavelength. The signal light beam is transmitted through the input optical fiber, reflected from the first adjustable mirror array to the reference mirror, reflected from the reference mirror to the second adjustable mirror array, and transmitted through the output optical fiber.

In a further aspect of the present invention, a method for optical beam alignment comprises steps of: directing a first reference light beam from a first optical fiber to be incident on a reference mirror at a first position; directing a second reference light beam from a second optical fiber to be incident on the reference mirror at a second position; and forming an aligned optical path by moving the first position and the second position to a pre-determined location on the reference mirror where an angle of incidence of the first reference light beam on the reference mirror is equal to an angle of incidence of the second reference light beam on the reference mirror.

In still a further aspect of the present invention, a method for optically switching light beams in an optical switch comprises steps of: selecting an input optical fiber and an output optical fiber to be optically connected to each other; inserting a first reference light beam in the input optical fiber to be incident on a reference mirror at a first position; inserting a second reference light beam in the output optical fiber to be incident on the reference mirror at a second position; and adjusting the first position and the second position to a pre-determined location on the reference mirror where an angle of incidence of the first reference light beam on the reference mirror is equal to an angle of incidence of the second reference light beam on the reference mirror, thereby forming an aligned optical path between the input optical fiber and the output optical fiber.

These and other features, aspects and advantages of the present invention will become better understood with reference to the following drawings, description and claims.

BRIEF DESCRIPTION OF THE DRAWINGS

FIG. 4 is a flow chart illustrating one example of a method for switching optical beams using a 3-dimensional optical switch, in accordance with one embodiment of the present invention.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

Broadly, the present invention provides a feedback control system for optical beam alignment in an analog, 3-dimensional, all optical, fiber optical switch. The present invention can be used in the context of optical communication systems and switching networks, where optical switching may be used to provide components such as optical add/drop modules (OADM), protection switches, and non-blocking cross connect switches.

In one embodiment, the present invention uses reference beams, of a different wavelength from the signal beams, to facilitate optical beam alignment of the signal beams so that no imposition is made on the signal beam, in terms of either signal intensity or duration, for aligning the signal beam, in contrast to the prior art, which, as in U.S. Pat. No. 5,206,497 for example, consumes a portion of the signal beam intensity by partially reflecting the signal beam off a mirror for use as a reference beam, and only partially transmits the signal beam through the mirror. By way of contrast, one embodiment of the present invention totally transmits reference beams that are completely separate from the signal beam through the mirror and totally reflects the signal beam off the mirror. Since the signal light will not be on until the optical path is established, i.e., until the signal beam is aligned, there is no dynamic cross talk in the present invention, unlike the prior art.

Figure 1A:
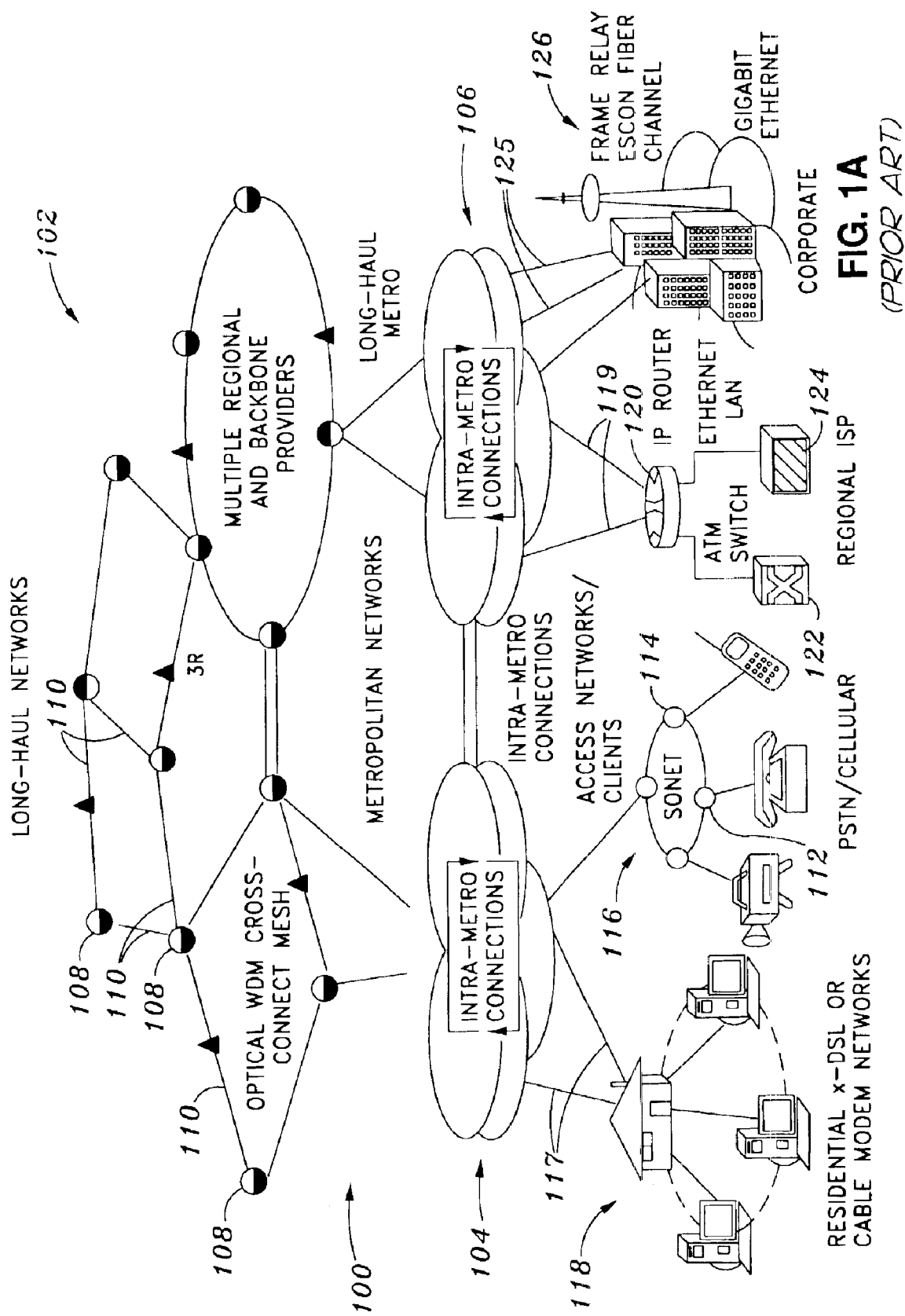
FIG. 1A is a diagram showing a hierarchy of optical communication networks in a prior art optical communication system.
Figure 1B:
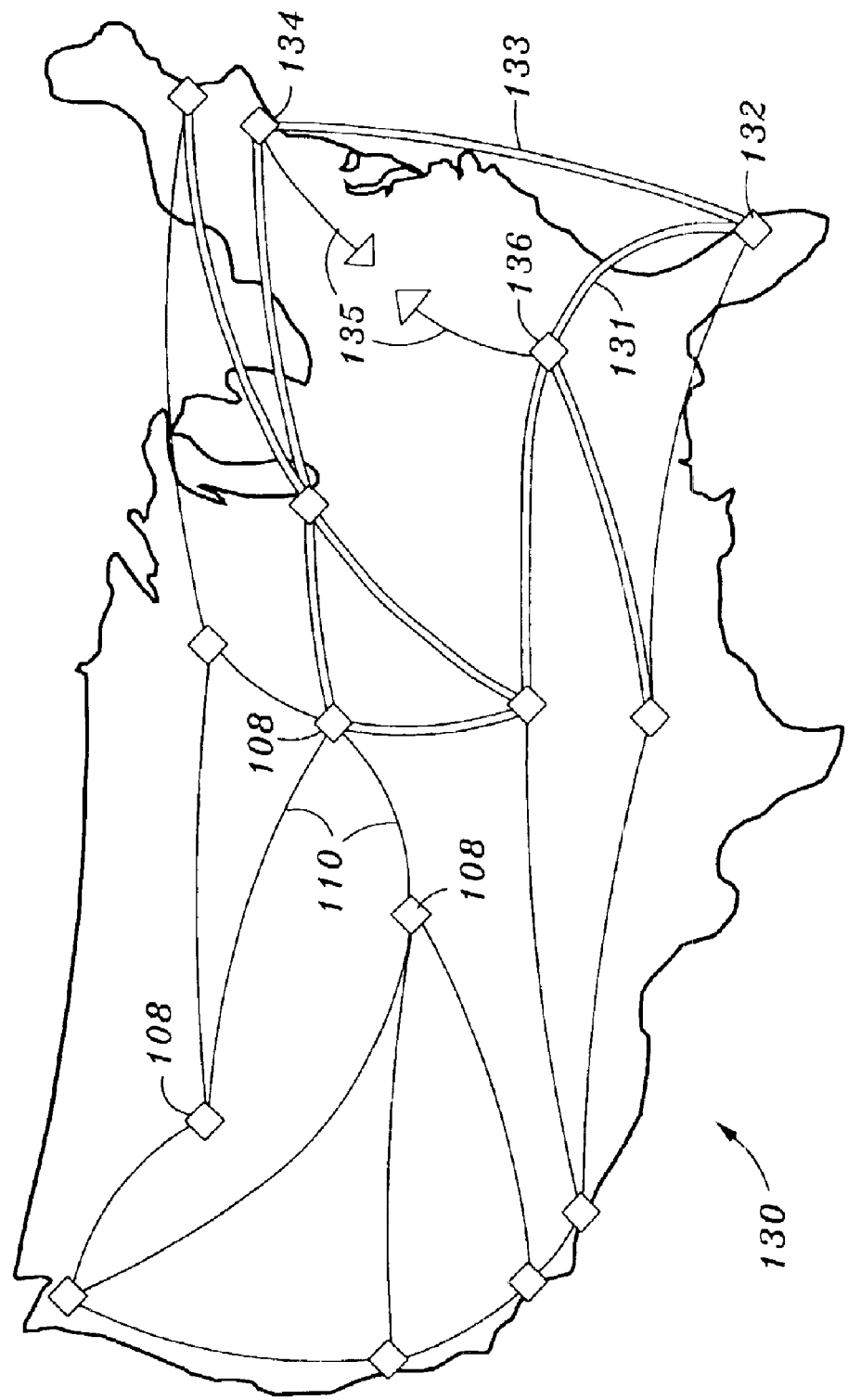
FIG. 1B is a diagram for an example of a long-haul network in the hierarchy shown in FIG. 1A for prior art optical communication systems.
Figure 1C:
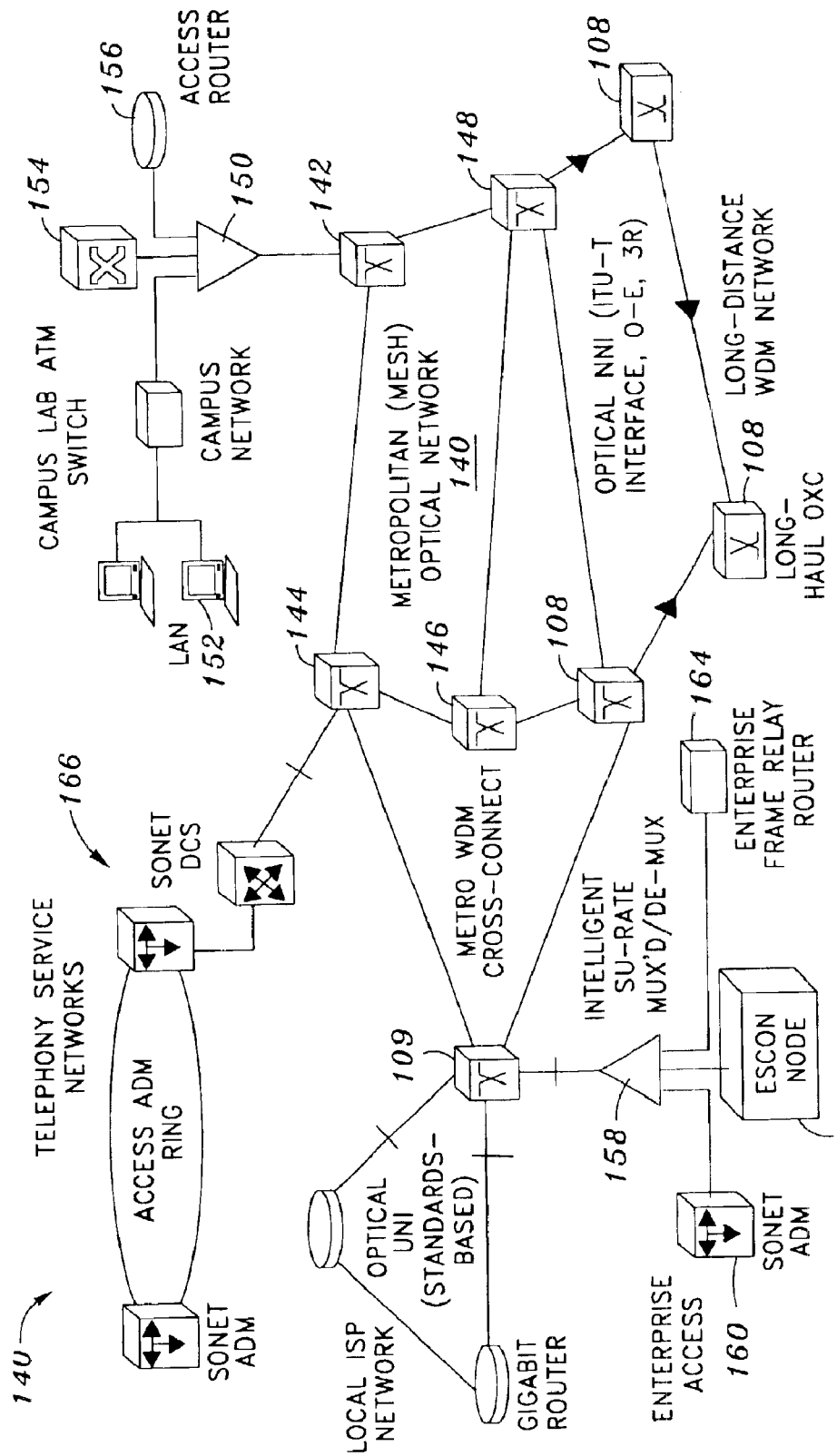
FIG. 1C is a diagram for an example of a metropolitan network in the hierarchy shown in FIG. 1A for prior art optical communication systems.
Figure 2A:
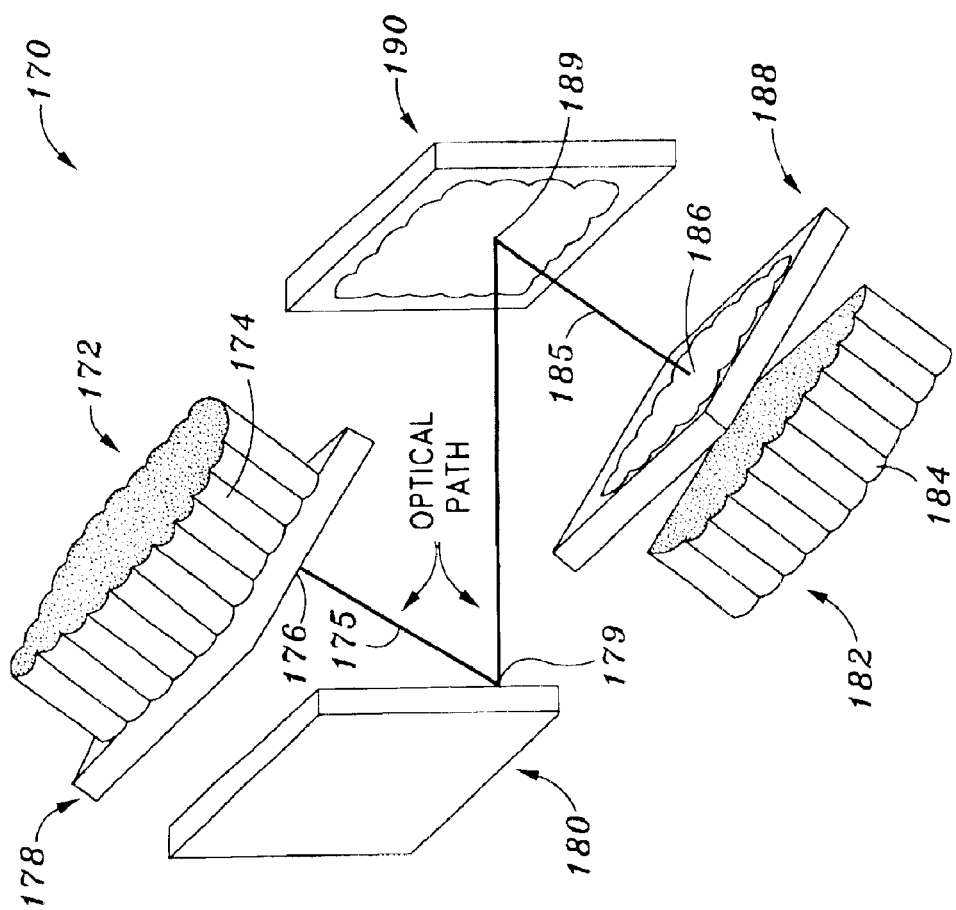
FIG. 2A is a perspective view showing a 3-dimensional optical switch, according to the prior art.
Figure 2B:
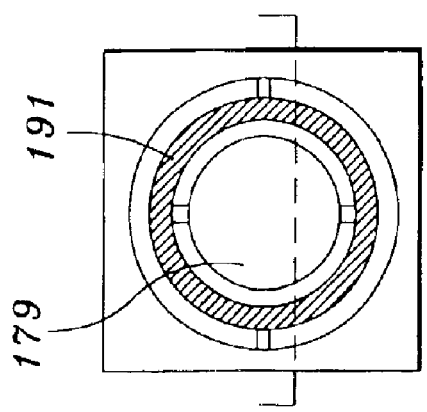
FIG. 2B is a plan view of an adjustable mirror and gimbals in the MEMS adjustable mirror array shown in FIG. 2A.
Figure 2C:
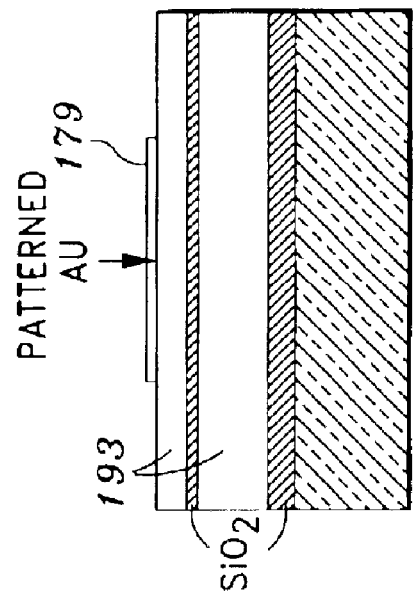
FIG. 2C is a cross-sectional view of an adjustable mirror and gimbals, before structural release of the gimbaled mirror, in the MEMS adjustable mirror array shown in FIG. 2A.
Figure 2D:
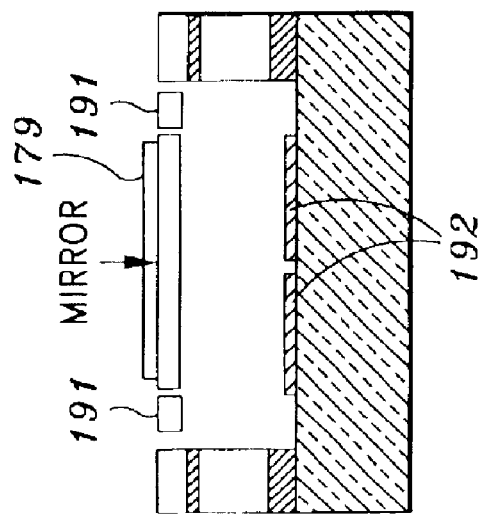
FIG. 2D is a cross-sectional view of an adjustable mirror and gimbals, after structural release of the gimbaled mirror, in the MEMS adjustable mirror array shown in FIG. 2A.
Figure 3A:
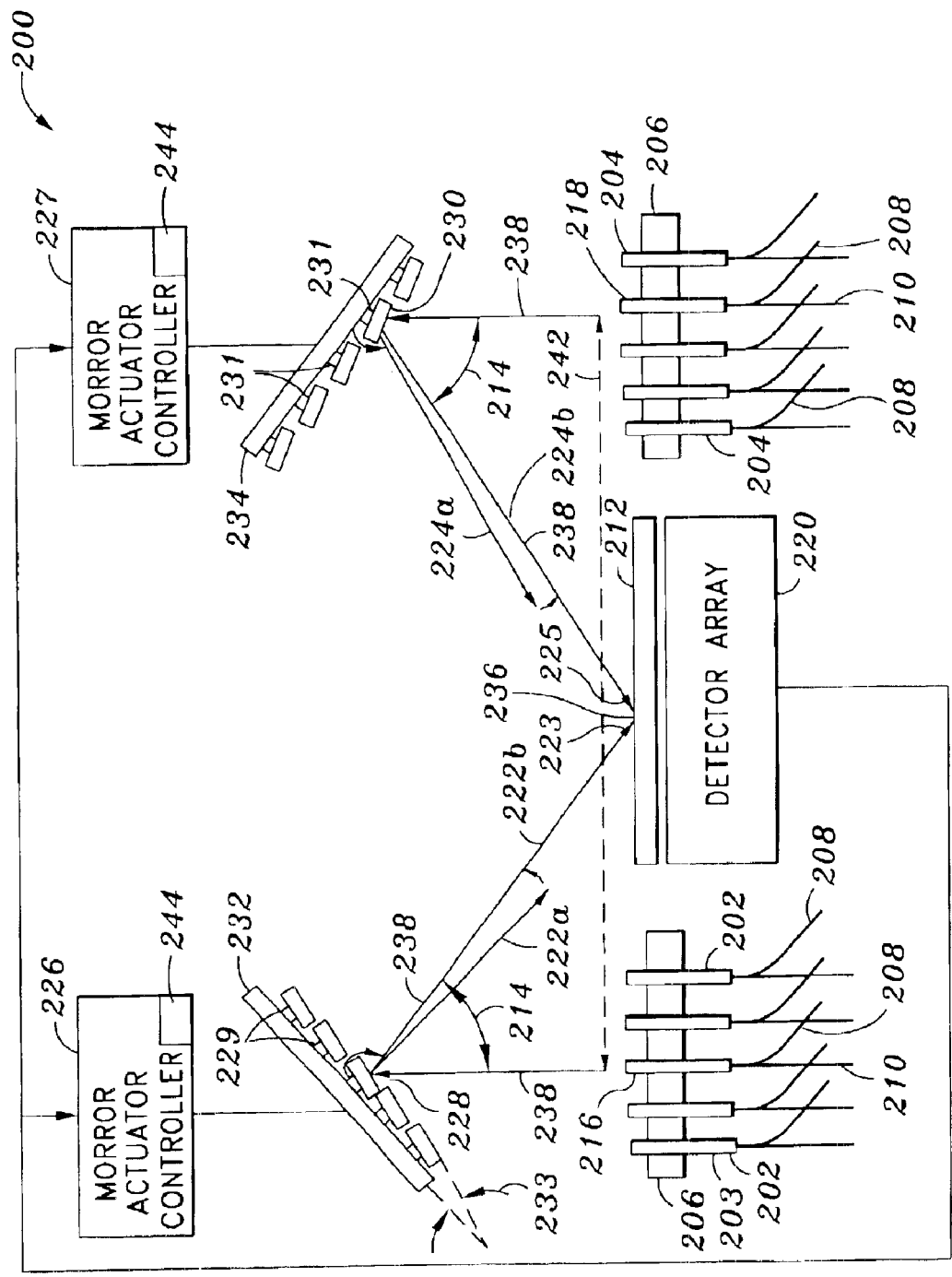
FIG. 3A is a cross-sectional block diagram of a 3-dimensional optical switch, in accordance with one embodiment of the present invention.

Referring now to FIG. 3A, exemplary image feedback optical switch 200, according to one embodiment, is illustrated. Optical switch 200 could be used, for example, as a non-blocking cross-connect switch, protection switch, add/drop module, or mux/demux in an optical communication system anywhere within optical communication system hierarchy 100. For example, optical switch 200 could be used in long haul switching network 102, metro telecommunications switching network 104, optical add/drop module 150, ATM switch 154, access router 156, mux/demux 158, SONET add/drop multiplexer 160, ESCON network 126, ESCON node 162, enterprise frame relay router 164, or SONET distributed communication system 166.

Optical switch 200 may include a plurality of input optical fibers 202 and output optical fibers 204 secured in lens mounts 206. Because light can propagate in either direction along an optical fiber, the terms "input" and "output" are used for convenience and do not necessarily limit the direction of signal propagation. Each optical fiber 202, 204 may comprise a collimator 203, which may include a glass capillary, as known in the art, surrounding the end of the optical fiber and surrounding a collimating lens, which may be a graded index, called grin lens, or be a compensated lens, called C-lens, with the glass capillary holding the end of the optical fiber in proximity to the collimating lens. Optical fibers 202 and 204 may be configured to transmit a reference beam of light 208 at a reference wavelength and a signal beam of light 210 at a signal wavelength. The reference wavelength, for example, may be 850 nanometers (nm), and the signal wavelength may be, for example, 1550 nm or 1300 nm. Signal wavelengths may be standard wavelengths for optimal transmission through the optical fibers. A reference wavelength may be chosen to be easily generated by a small, inexpensive GaAs laser and so as not to interfere with the signal wavelength.

A fixed mirror 212 may be provided near the middle of the optical paths from the input optical fibers 202 to the output optical fibers 204, for example, optical path 214 from input optical fiber 216 to output optical fiber 218. Mirror 212 may be configured so as to totally transmit light at the reference wavelength, 850 nm, for example, and to totally reflect light at the signal wavelength, 1550 nm or 1300 nm, for example. Mirror 212 may be optically coated, for example, to be transparent in the 850 nm portion of the spectrum while being opaque, or totally reflective, in the 1300 nm and 1550 nm portions of the spectrum.

Optical switch 200 may further include a detector array 220 that is photosensitive at the reference wavelength of light. For example, an array of charge coupled devices (CCD) that are photosensitive in the 850 nm portion of the spectrum may be used to sense a first position 223 on detector array 220 of reference light beam 222 that is transmitted through mirror 212 so that reference light beam 222 is incident on detector array 220. Similarly, a second position 225 may be sensed, by detector array 220, of reference light beam 224 that is transmitted through mirror 212 so that reference light beam 224 is incident on detector array 220.

First position 223 may be fed electronically using feedback signal 250, as known in the art, by detector array 220 to mirror actuator controller 226 for providing feedback control of the position of first position 223 on detector array 220. Likewise, second position 225 may be fed electronically using feedback signal 250, as known in the art, by detector array 220 to mirror actuator controller 227 for providing feedback control of the position of second position 225 on detector array 220. Each mirror actuator controller 226, 227, as known in the art, may be implemented, for example, using a microprocessor or custom-made application specific integrated circuit (ASIC) chip. Both mirror actuator controllers 226, 227 may be implemented together on the same chip or using the same microprocessor as can be appreciated by one of ordinary skill in the art, so that, in effect only one mirror actuator controller is needed, although two are shown in FIG. 3A for purposes of illustration.

Mirror actuator controllers 226, 227 may drive actuators 229, 231, which may be implemented, for example, as electrodes for applying an electric field, as described above, or as inductors for applying a magnetic field to adjustable mirrors 228 and 230 of adjustable mirror array 232 and adjustable mirror array 234. Actuators 229, 231 may be used for individually adjusting each adjustable mirror, for example, adjustable mirrors 228 and 230 of adjustable mirror array 232 and adjustable mirror array 234, respectively. For example, adjustable mirror arrays 232, 234 may be implemented using a micro-electromechanical system (MEMS) adjustable mirror array made by Lucent Technologies, Inc under the trade name Microstar®. Alternatively, spatial light modulators—such as those disclosed by U.S. Pat. No. 6,430,328 issued to Culver, et al. and incorporated herein by reference—could be substituted for the adjustable mirrors 228 and 230 of adjustable mirror array 232 and adjustable mirror array 234, and the spatial light modulators could be controlled by a controller having the same effect as that of mirror actuator controllers 226 and 227.

Mirror actuator controllers 226, 227 may be programmed, for example, to control an adjustment, i.e., to adjust the angle, for example, angle 233 of adjustable mirror 228 to move reference light beam 222a to reference light beam 222b to coincide with a pre-determined location 236 on detector array 220. Likewise, mirror actuator controller 227 may be programmed, for example, to adjust the angle, such as angle 233, of adjustable mirror 230 to move reference light beam 224a to reference light beam 224b to coincide with the pre-determined location 236 on detector array 220.

Pre-determined location 236 is unique to each chosen pair comprising an input optical fiber and an output optical fiber. In other words, there is a distinct pre-determined location 236 for each input-output pair of optical fibers. Once both beams of the chosen pair have been moved to the same distinct pre-determined location 236, the two beams may align to form an aligned optical path from the input optical fiber of the chosen pair to the output optical fiber of the chosen pair. In this example, the chosen pair comprises input optical fiber 216 and output optical fiber 218. For example, pre-determined location 236 shown in FIG. 3A is uniquely determined corresponding to input optical fiber 216 and output optical fiber 218. For example, the pre-determined location 236 may be determined as the point of the optical path from the input optical fiber to the output optical fiber, for example, optical path 214 from input optical fiber 216 to output optical fiber 218 where the angle of reflection from mirror 212 equals the angle of incidence on mirror 212.

Figure 3B:
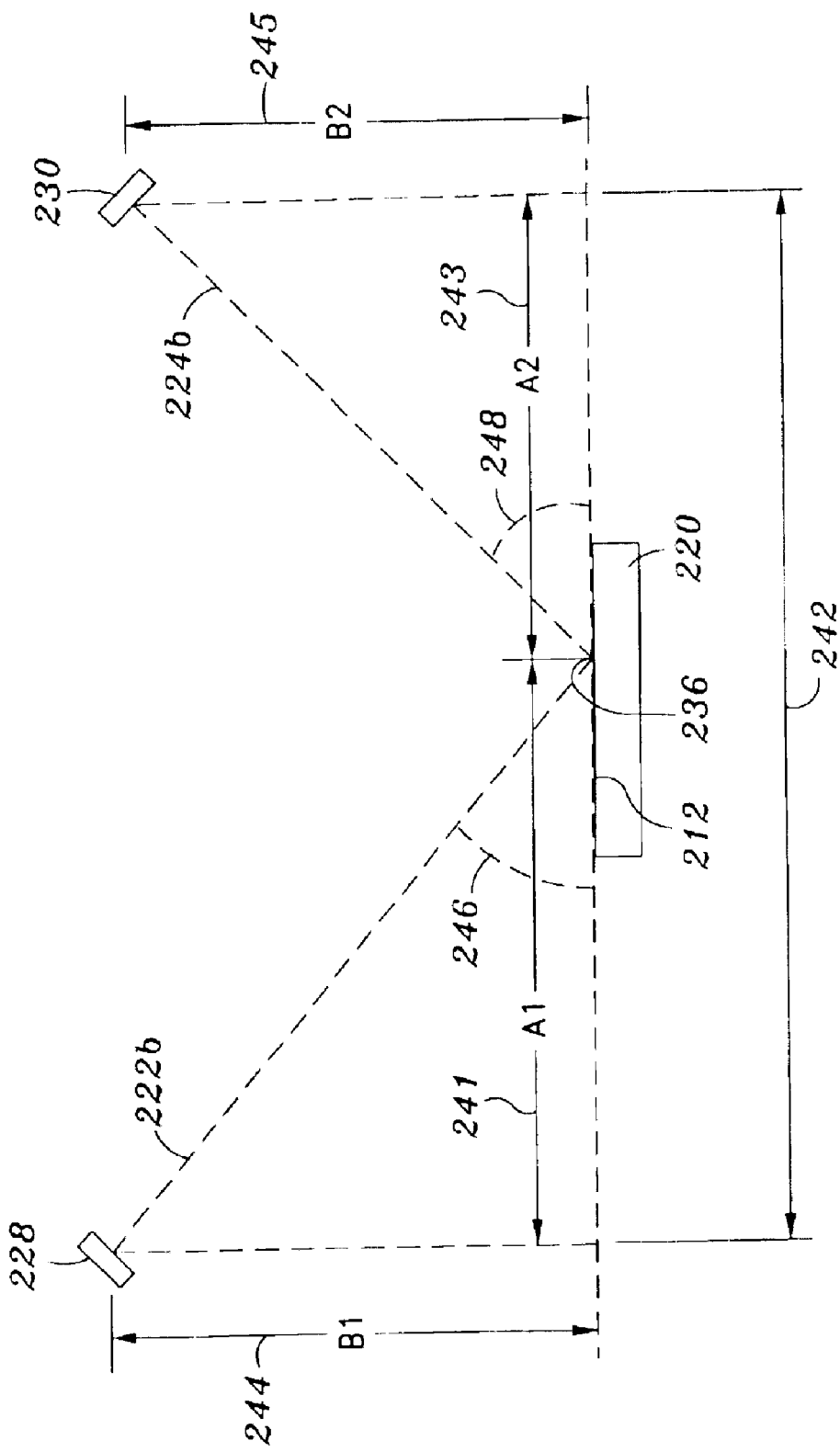
FIG. 3B is a simplified schematic diagram of the 3-dimensional optical switch of FIG. 3A.

Referring now to FIG. 3B to illustrate this example, pre-determined location 236 may be determined by calculating, using the distance 242 from input optical fiber 216 to output optical fiber 218 relative to mirror 212 and detector array 220, as more clearly shown in FIG. 3B, the point on reference mirror 212 where angle of incidence 246 of reference light beam 222b equals angle of incidence 248 of reference light beam 224b. For example, pre-determined location 236 may be seen to be specified by distance 241 and distance 243, labeled A1 and A2, respectively, in FIG. 3B. The distances 241 and 243, for which angle of incidence 246 equals angle of incidence 248 may be calculated, for example, using distance 244 and distance 245. Distance 244, labeled B1 in FIG. 3B, is the distance above the plane of detector array 220 of the reflection of reference light beam 222b off adjustable mirror 228. Likewise, distance 245, labeled B2 in FIG. 3B, is the distance above the plane of detector array 220 of the reflection of reference light beam 224b off adjustable mirror 230. The distances 241 and 243, i.e., A1 and A2, may then be calculated using the following formula, for example:

$$A1/B1 = A2/B2 = (A1+A2)/(B1+B2)$$

where A1+A2 is the distance 242 from input optical fiber 216 to output optical fiber 218 and B1+B2 is the sum of the distances 244 and 245.

Once determined, pre-determined location 236 may be stored in a memory 244 in mirror actuator controllers 226, 227. For example, a table of pre-determined locations 236, with one location corresponding to each pair of an input optical fiber 202 and an output optical fiber 204, may be stored in a digital memory 244 in mirror actuator controller 226.

Once the mirror angles, such as mirror angle 233, for adjustable mirrors 228, 230, for example, have been found by moving first reference light beam 222a to first reference light beam 222b and second reference light beam 224a to second reference light beam 224b so that both first reference light beam 222b and second reference light beam 224b are incident on the pre-determined location 236 on detector array 220, an optical beam alignment is established from input optical fiber 216 to output optical fiber 218 so that a signal light beam 238, at the signal wavelength, may be propagated between input optical fiber 216 and output optical fiber 218, for example, using mirror 212 to reflect signal light beam 238 so that it is coincident with both reference light beam 222b and reference light beam 224b, as well as with optical path 214. Thus, the pair comprising input optical fiber 216 and output optical fiber 218, and indeed any pair comprising an input optical fiber 202 and an output optical fiber 204, may be optically connected.

Referring now to FIG. 4, a method of feedback control for optical beam alignment for optically switching light beams is illustrated by a flow chart depicting exemplary method 300 in accordance with one embodiment. Method 300 may include a step 302 in which an input array 104 of input optical fibers 202, and an output array 106 of output optical fibers 204, is provided. Step 302 may further include determining a pre-determined location 236 on a detector array 220 for a pair of optical fibers comprising, for example, an input optical fiber 216 and an output optical fiber 218. Pre-determined location 236 on detector array 220 may be determined so that a signal light beam 238 coincident with a first reference light beam 222b is reflected from a mirror 212 to be coincident with a second reference light beam 224b. Pre-determined location 236 may be determined by calculation as described above.

Method 300 may include a step 304 of inserting a first reference light beam 222b in an input optical fiber 202 to be incident on detector array 220 at a first position 223 and concurrently inserting a second reference light beam 224b in an output optical fiber 204 to be incident on detector array 220 at a second position 225. First reference light beam 222b and second reference light beam 224b may be transmitted through mirror 212 to detector array 220.

Method 300 may include a step 306 of adjusting a first adjustable mirror 228 so that first position 223 is moved to pre-determined location 236 and adjusting a second adjustable mirror 230 so that second position 225 is also moved to pre-determined location 236.

Method 300 may include a step 308 of transmitting a signal light beam 238 on optical path 214 through an input optical fiber 202, for example, input optical fiber 216, reflecting from mirror 212, and through an output optical fiber 204, for example, output optical fiber 218. Thus, any pair comprising an input optical fiber 202 and an output optical fiber 204 may be optically connected.

Step 308 may further include connecting optical switch 200 as an optical switch for use as a protection switch where the input array 104 comprises input optical fibers 202 as working optical fibers and protection optical fibers, and the output array 106 comprises output optical fibers 204 as working optical fibers and protection optical fibers.

Step 308 may further include connecting optical switch 200 as an optical switch for use as an add/drop module where the input array 104 comprises input optical fibers 202 as working and add optical fibers, and output array 106 comprises output optical fibers 204 as working and drop optical fibers.

Step 308 may further include connecting optical switch 200 as an optical switch for use as a non-blocking cross-connect switch where input array 104 comprises input optical fibers 202 as working optical fibers, and output array 106 comprises output optical fibers 204 as working optical fibers.

Method 300 may include a step 310 for optimizing switch performance by checking and adjusting signal beam alignment, for example, correcting the adjustment of adjustable mirrors 228 and 230 to provide optical path 214 for signal light beam 238 using feed back control, as known in the art.

It should be understood, of course, that the foregoing relates to preferred embodiments of the invention and that modifications may be made without departing from the spirit and scope of the invention as set forth in the following claims.

We claim:

1. An optical switch comprising:
a reference mirror that reflects a signal wavelength of light and transmits a reference wavelength of light;
a first adjustable mirror array disposed relative to said reference mirror such that a first reference light beam having said reference wavelength is reflected from said first adjustable mirror array to said reference mirror;
a second adjustable mirror array disposed relative to said reference mirror such that a second reference light beam having said reference wavelength is reflected from said second adjustable mirror array to said reference mirror;
a detector array adjacent to said reference mirror, wherein said detector array:
 indicates a first position of said first reference light beam incident on said reference mirror and transmitted through said reference mirror to said detector array, and
 indicates a second position of said second reference light beam incident on said reference mirror and transmitted through said reference mirror to said detector array;
a controller that:
 receives said first position and adjusts said first adjustable mirror array so that said first position is moved to a pre-determined location on said reference mirror; and
 receives said second position and adjusts said second adjustable mirror array so that said second position is moved to said pre-determined location,
 thereby establishing an optical beam alignment for a signal light beam having said signal wavelength wherein said signal light beam is reflected from said first adjustable mirror array to said reference mirror and is reflected from said reference mirror to said second adjustable mirror array.

2. The optical switch of claim 1 wherein said pre-determined location is a unique location where an angle of incidence of said signal light beam from said first adjustable mirror array on said reference mirror is equal to an angle of reflection of said signal light beam from said reference mirror to said second adjustable mirror array when said signal light beam is coincident with said first reference light beam and with said second reference light beam.

3. The optical switch of claim 1 further comprising:
   at least one input optical fiber; and
   at least one output optical fiber having an optical path from said at least one input optical fiber to said at least one output optical fiber;
   said optical path reflecting off said first adjustable mirror array, said reference mirror, and said second adjustable mirror array; and
   wherein said pre-determined location is a unique location on said reference mirror where an angle of incidence is equal to an angle of reflection for a light beam on said optical path.

4. The optical switch of claim 1 wherein said detector array comprises a plurality of charge-coupled devices, said plurality of charge-coupled devices sensing said first position and said second position relative to said detector array.

5. The optical switch of claim 1 further comprising a memory wherein said pre-determined location is stored in said memory.

6. The optical switch of claim 1 further comprising an optical fiber configured to transmit said reference light beam at said reference wavelength and said signal light beam at said signal wavelength.

7. The optical switch of claim 1 wherein:
   said reference wavelength is 850 nm; and
   said signal wavelength is selected from the group consisting of 1550 nm and 1300 nm.

8. The optical switch of claim 1 wherein said first adjustable mirror array is identical with said second adjustable mirror array.

9. An optical switch comprising:
   a reference mirror that reflects a signal wavelength of light and transmits a reference wavelength of light;
   a first adjustable mirror array disposed relative to said reference mirror such that a first reference light beam having said reference wavelength is reflected from said first adjustable mirror array to said reference mirror;
   a second adjustable mirror array disposed relative to said reference mirror such that a second reference light beam having said reference wavelength is reflected from said second adjustable mirror array to said reference mirror;
   at least one input optical fiber;
   at least one output optical fiber, said at least one input optical fiber and said at least one output optical fiber having an optical path between said at least one input optical fiber and said at least one output optical fiber, said optical path reflecting off said first adjustable mirror array, said reference mirror, and said second adjustable mirror array, wherein
   a pre-determined location is a unique location on said reference mirror where an angle of incidence is equal to an angle of reflection for said optical path;
   a detector array adjacent said reference mirror, wherein said detector array:
      indicates a first position of said first reference light beam incident on said reference mirror and transmitted through said reference mirror to said detector array, and
      indicates a second position of said second reference light beam incident on said reference mirror and transmitted through said reference mirror to said detector array;
   a controller that:
      receives said first position and adjusts said first adjustable mirror array so that said first position is moved to said pre-determined location and
      receives said second position and adjusts said second adjustable mirror array so that said second position is moved to said pre-determined location,
      thereby establishing an optical beam alignment for a signal light beam having said signal wavelength wherein said signal light beam propagates on said optical path between said at least one input optical fiber and said at least one output optical fiber.

10. The optical switch of claim 9 wherein:
    said first reference light beam is transmitted through said at least one input optical fiber; and
    said second reference light beam is transmitted through said at least one output optical fiber.

11. The optical switch of claim 9 wherein said detector array comprises a plurality of charge-coupled devices, said plurality of charge-coupled devices sensing said first position and said second position relative to said at least one input optical fiber and said at least one output optical fiber.

12. The optical switch of claim 9 wherein said controller further comprises a memory, with said pre-determined location being stored in said memory.

13. The optical switch of claim 9 wherein said input optical fiber is configured to transmit said first reference light beam at said reference wavelength and said signal light beam at said signal wavelength.

14. The optical switch of claim 9 further comprising:
    a second input optical fiber;
    a second output optical fiber wherein:
    said at least one input optical fiber is connected as a working fiber;
    said second input optical fiber is connected as a protection fiber;
    said at least one output optical fiber is connected as a working fiber;
    said second output optical fiber is connected as a protection fiber; and
    said optical switch is connected for use as a protection switch.

15. The optical switch of claim 9 further comprising:
    a second input optical fiber;
    a second output optical fiber wherein:
    said at least one input optical fiber is connected as a working fiber;
    said second input optical fiber is connected as an add fiber;
    said at least one output optical fiber is connected as a working fiber;
    said second output optical fiber is connected as a drop fiber; and
    said optical switch is connected for use as an add/drop module.

16. The optical switch of claim 9 wherein:
said at least one input optical fiber is connected as a working fiber;
said at least one output optical fiber is connected as a working fiber; and
said optical switch is connected for use as a non-blocking cross-connect switch.

17. A 3-dimensional optical cross-connect switch comprising:
a reference mirror that reflects a signal wavelength of light and transmits a reference wavelength of light;
a first adjustable mirror array disposed relative to said reference mirror such that a first reference light beam having said reference wavelength is reflected from said first adjustable mirror array to said reference mirror;
a second adjustable mirror array disposed relative to said reference mirror such that a second reference light beam having said reference wavelength is reflected from said second adjustable mirror array to said reference mirror;
an input fiber array comprising at least one input optical fiber, said at least one input optical fiber transmitting said first reference light beam at said reference wavelength;
an output fiber array comprising at least one output optical fiber, said at least one output optical fiber transmitting said second reference light beam at said reference wavelength;
said at least one input optical fiber and said at least one output optical fiber having an optical path between said at least one input optical fiber and said at least one output optical fiber;
said optical path reflecting off said first adjustable mirror array, said reference mirror, and said second adjustable mirror array, wherein:
a pre-determined location is a unique location on said reference mirror where an angle of incidence is equal to an angle of reflection for said optical path;
a detector array adjacent said reference mirror, said detector array comprising a plurality of charge-coupled devices, said plurality of charge-coupled devices sensing a first position of said first reference light beam incident on said reference mirror and transmitted through said reference mirror to said detector array and said plurality of charge-coupled devices sensing a second position of said second reference light beam incident on said reference mirror and transmitted through said reference mirror to said detector array, wherein said detector array indicates said first position and said second position relative to said at least one input optical fiber and said at least one output optical fiber;
a controller comprising a memory, said pre-determined location being stored in said memory, wherein said controller:
receives said first position and adjusts said first adjustable mirror array so that said first position is moved to said pre-determined location and
receives said second position and adjusts said second adjustable mirror array so that said second position is moved to said pre-determined location,
thereby establishing an optical beam alignment for a signal light beam having said signal wavelength wherein said signal light beam is transmitted from said at least one input optical fiber at said signal wavelength on said optical path to said at least one output optical fiber.

18. The 3-dimensional optical cross-connect switch of claim 17 wherein:
said input fiber array comprises working optical fibers and protection optical fibers;
said output fiber array comprises working optical fibers and protection optical fibers; and
said 3-dimensional optical cross-connect switch is connected for use as a protection switch.

19. The 3-dimensional optical cross-connect switch of claim 17 wherein:
said input fiber array comprises working optical fibers and add optical fibers;
said output fiber array comprises working optical fibers and drop optical fibers; and
said 3-dimensional optical cross-connect switch is connected for use as an add/drop module.

20. The 3-dimensional optical cross-connect of claim 17 wherein:
said input fiber array comprises working optical fibers;
said output fiber array comprises working optical fibers; and
said 3-dimensional optical cross-connect switch is connected for use as a non-blocking cross-connect switch.

21. An optical switching network comprising:
a plurality of nodes wherein at least one of said plurality of nodes comprises an optical switch;
a plurality of links wherein:
each of said plurality of links comprises at least one optical fiber,
each of said plurality of links optically connects two of said plurality of nodes,
at least one of said plurality of links includes an input optical fiber connected to said optical switch, and
at least one of said plurality of links includes an output optical fiber connected to said optical switch;
wherein said optical switch comprises:
a reference mirror that reflects a signal wavelength of light and transmits a reference wavelength of light;
a first adjustable mirror array disposed relative to said reference mirror such that a first reference light beam having said reference wavelength transmitted through said input optical fiber is reflected from said first adjustable mirror array to said reference mirror;
a second adjustable mirror array disposed relative to said reference mirror such that a second reference light beam having said reference wavelength transmitted through said output optical fiber is reflected from said second adjustable mirror array to said reference mirror;
a detector array adjacent said reference mirror, wherein said detector array:
indicates a first position of said first reference light beam incident on said reference mirror and transmitted through said mirror to said detector array, and
indicates a second position of said second reference light beam incident on said reference mirror and transmitted through said reference mirror to said detector array;
a controller comprising a memory, with a pre-determined location being stored in said memory, wherein said controller:
receives said first position and adjusts said first adjustable mirror array so that said first position is moved to said pre-determined location on said reference mirror and receives said second position and adjusts said second adjustable mirror array so that said second position is moved to said pre-determined location, thereby establishing an optical beam alignment for a signal light beam having said signal wavelength wherein said signal light beam is transmitted through said input optical fiber, reflected from said first adjustable mirror array to said reference mirror, reflected from said reference mirror to said second adjustable mirror array, and transmitted through said output optical fiber.

22. The optical switching network of claim 21 wherein:

said input optical fiber and said output optical fiber have an optical path from said input optical fiber to said output optical fiber; and said optical path reflecting off said first adjustable mirror array, said reference mirror, and said second adjustable mirror array, wherein:

said pre-determined location is a unique location on said reference mirror where an angle of incidence is equal to an angle of reflection for a light beam on said optical path.

23. The optical switching network of claim 21 further comprising:

a second input optical fiber connected to said optical switch;

a second output optical fiber connected to said optical switch wherein:

said input optical fiber is connected as a working fiber;

said second input optical fiber is connected as a protection fiber;

said output optical fiber is connected as a working fiber;

said second output optical fiber is connected as a protection fiber; and said optical switch is connected for use as a protection switch.

24. The optical switching network of claim 21 further comprising:

a second input optical fiber connected to said optical switch;

a second output optical fiber connected to said optical switch wherein:

said input optical fiber is connected as a working fiber;

said second input optical fiber is connected as an add fiber;

said output optical fiber is connected as a working fiber;

said second output optical fiber is connected as a drop fiber; and said optical switch is connected for use as an add/drop module.

25. The optical switching network of claim 21 wherein said input optical fiber is connected as a working fiber;

said output optical fiber is connected as a working fiber; and said optical switch is connected for use as a non-blocking cross-connect switch.

* * * * *